(12) United States Patent
Pan

(10) Patent No.: US 8,789,953 B2
(45) Date of Patent: Jul. 29, 2014

(54) VIDEO DELIVERY SYSTEM USING TABLET COMPUTER AND DETACHABLE MICRO PROJECTORS

(76) Inventor: Yang Pan, Singapore (SG)

( * ) Notice: Subject to any disclaimer, the term of this patent is extended or adjusted under 35 U.S.C. 154(b) by 345 days.

(21) Appl. No.: 13/360,821

(22) Filed: Jan. 30, 2012

(65) Prior Publication Data

US 2013/0194495 A1     Aug. 1, 2013

(51) Int. Cl.
*G03B 21/26*     (2006.01)
*H04N 9/31*     (2006.01)
*H04N 7/14*     (2006.01)

(52) U.S. Cl.
USPC ............ 353/94; 353/30; 353/119; 348/14.03; 348/744; 725/81; 361/679.01; 345/156

(58) Field of Classification Search
USPC ........... 353/94, 122, 30, 119; 348/744, 14.03; 725/81; 361/679.01, 679.29; 345/156
See application file for complete search history.

(56) References Cited

U.S. PATENT DOCUMENTS

| | | | |
|---|---|---|---|
| 6,115,618 A | 9/2000 | Lebby et al. | |
| 6,489,934 B1 | 12/2002 | Klausner | |
| 6,966,651 B2 | 11/2005 | Johnson | |
| 7,118,220 B2 | 10/2006 | Castaldi et al. | |
| 7,134,078 B2 | 11/2006 | Vaarala | |
| 2002/0063855 A1 | 5/2002 | Williams | |
| 2003/0017846 A1 | 1/2003 | Estevez et al. | |
| 2003/0038927 A1 | 2/2003 | Alden | |
| 2003/0117343 A1 | 6/2003 | Kling | |
| 2006/0009257 A1 | 1/2006 | Ku | |
| 2006/0209374 A1 | 9/2006 | Willemsen | |
| 2007/0099700 A1 | 5/2007 | Solomon et al. | |
| 2007/0205980 A1 | 9/2007 | Dijk | |
| 2007/0229772 A1 | 10/2007 | De Vaan | |
| 2007/0273848 A1 | 11/2007 | Fan et al. | |
| 2007/0282564 A1 | 12/2007 | Sprague et al. | |
| 2008/0014995 A1 | 1/2008 | Noba | |
| 2008/0018591 A1 * | 1/2008 | Pittel et al. ..................... | 345/156 |
| 2008/0055550 A1 | 3/2008 | Kim | |
| 2008/0136973 A1 * | 6/2008 | Park .............................. | 348/744 |
| 2010/0002151 A1 * | 1/2010 | Pan ............................... | 348/744 |
| 2012/0214323 A1 * | 8/2012 | Gore et al. .................... | 439/212 |
| 2013/0169887 A1 * | 7/2013 | Wu et al. ....................... | 348/744 |

* cited by examiner

*Primary Examiner* — Georgia Y Epps
*Assistant Examiner* — Magda Cruz

(57) ABSTRACT

A video delivery system includes a tablet computer and one or two detachable projectors. In one embodiment, video files are transferred from the tablet computer to the projectors when they are connected. The tablet computer is used as a remote control that controls an operation of delivering a video portion of the video file through the projectors and an audio portion through the tablet computer in a synchronized manner. In one aspect, the two projectors may be positioned to project two adjacent screens that present different portions of images. In another embodiment, positions of the projectors attached to the tablet computer may be adjusted to deliver desired screens.

20 Claims, 10 Drawing Sheets

VIDEO DELIVERY SYSTEM USING TABLET COMPUTER AND DETACHABLE MICRO PROJECTORS

CROSS-REFERENCE TO RELATED APPLICATIONS

The present application is related to the U.S. patent application Ser. No. 12/166,268.

BACKGROUND

1. Field of Invention

This invention relates to a video delivery system, specifically to an image and video delivery system employing a tablet computer and dual micro projectors.

2. Description of Prior Art

A tablet computer has become increasingly popular in recent years. An example of the device is the iPad from Apple Inc, Cupertino. On the other hand, there is an increased trend of integrating a micro projector with a handheld device. Opportunities exist for using the tablet computer and the micro projectors to improve media delivery experiences.

SUMMARY OF THE INVENTION

Accordingly, it is a purpose of the present invention to provide a portable computing device with dual detachable projectors that project two adjacent display screens.

It is a further purpose of the present invention to provide a portable computing device as a remote control for projectors when they are detached from the tablet computer.

It is still a further purpose of the present invention to provide a system including a portable computing device and two detachable projectors, wherein positions of the projectors are adjustable in order to project two adjacent display screens on a display surface.

It is still a further purpose of the present invention to provide a system including a portable computer and two detachable projectors, wherein at least video portion of a video file can be transferred from the tablet computer to the projectors when they are connected.

It is still a further purpose of the present invention to provide a method of delivering video portion of a video file through the projectors and an audio portion of the video file though the portable computing device in a synchronized manner controlled by the computing device.

An exemplary image and video delivery system comprises a portable computing device. A tablet computer is used to illustrate the inventive concept across the present application although the inventive concept can be extended to other types of portable computing devices including but not limited to a smart phone, a handheld media player, a laptop computer, a game console and an image capturing device. The exemplary tablet computer includes a rectangular shaped house with a front surface, a back surface and four sidewalls. Two projectors are attachable to a pair of sidewalls of the tablet computer through a pair of connectors. The connector may be an IEEE 1394 compliant connector. The connector may also be a Universal Serial Bus (USB) type of connector.

A media asset such as a video or an image file can be transferred from the tablet computer to the projectors when they are connected. The tablet computer may include a folder that stores media files to be transferred to the projectors. In one aspect, a user selects media files to be transferred through a user interface. In another aspect, a file system in the projector and the folder in the tablet computer are synchronized automatically after they are connected.

In one embodiment, the projectors project two display screens when they are connected to the tablet computer. Positions of the projectors may be adjusted through a positioning unit. In one aspect, the two screens are adjacent screens.

In another embodiment, the projectors project two display screens when they are detached from the tablet computer. The projectors may be placed into a supporting and positioning unit to project two desired display screens. The tablet computer can be used as a remote control for the projectors when they are detached from the tablet computer. Transceivers in the table computer and in the projectors form a wireless communication network.

In one operation mode, two projectors may present the same image. In another operation mode, two projectors may display two different images. In yet another operation mode, two projectors may display different portions of an image that form a complete image by the two adjacent screens.

In another aspect, the tablet computer may display two separated user interfaces for controlling two projectors independently.

In yet another aspect, each of the projectors includes a projector head that can be pivoted.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

References will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of invention as defined by the appended claims.

Figure 1:
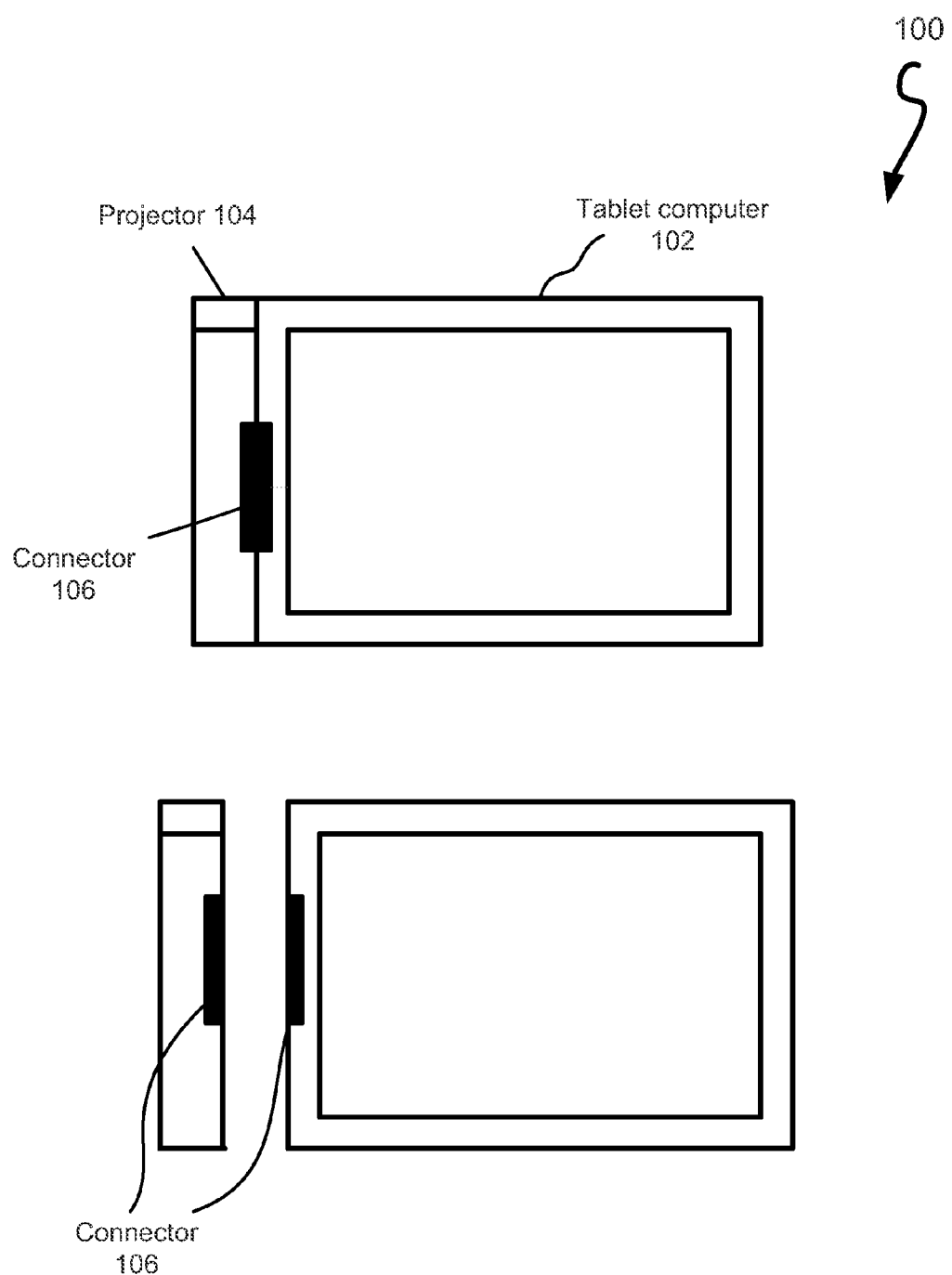
FIG. 1 is a schematic diagram of a tablet computer with a detachable projector.

FIG. 1 is a schematic diagram of an exemplary video delivery system 100 including a tablet computer 102 with a detachable projector 104. Projector 104 is attachable to tablet computer 102 through a connector 106. Tablet computer 102 includes a house in a rectangular shape. The house further includes a front surface, a back surface and four sidewalls. In some implementation, the corners of the house may be in rounded shapes. The front surface comprises a display screen, such as, for example a touch sensitive Liquid Crystal Display (LCD). The display screen may display a user interface for a user to operate tablet computer 102. Although tablet computer 102 is used to illustrate the inventive concept, other portable computing devices can also be employed within the scope of the present invention. The devices include but are not limited to a smart phone, a handheld media player, a laptop computer, a game console and a image capturing device. The portable computing devices may further include any combinations of the abovementioned devices.

Projector 104 may be a pico or a micro projector. The micro projector is an emerging technology that applies the use of an image projector in a handheld device. Projector 104 involves miniaturized hardware and software that can project digital images onto any nearby viewing surface, such as a wall. Projector 104 includes but is not limited to 1) Texas Instrument's Digital Light Processing (DLP); 2) Microvision's beam-steering technology; and a handful of LCoS (Liquid crystal on silicon). LED's or lasers may be used as light sources in the micro projectors. The micro projectors further comprise scanning minors which may be manufactured based on MEMS (Micro Electro Mechanical System) technologies.

Connector 106 may be an IEEE 1394 compliant type connector. Connector 106 may also be a USB type of connector. Tablet computer 102 and projector 104 are connected through the connector 106 that may further include a latch system (not shown in FIG. 1) to ease the connecting and disconnecting operations as those are obvious to the ones familiar with the art. A media file such as a video file may be delivered by the use of projector 104. In one aspect, projector 104 is attached to tablet computer 102 while the video file is presented. In another aspect, the projector 104 is detached from tablet computer 102. Tablet computer 102 is used as a remote control for projector 104. Tablet computer 102 and projector 104 are connected through a wireless link that includes but is not limited to a Bluetooth (IEEE 802.15.1 and its extensions) type of connection, a ZigBee (IEEE 802.15.4 and its extensions) type of connection and a WiFi (IEEE 802.11 and its extensions) type of connection.

Figure 2:
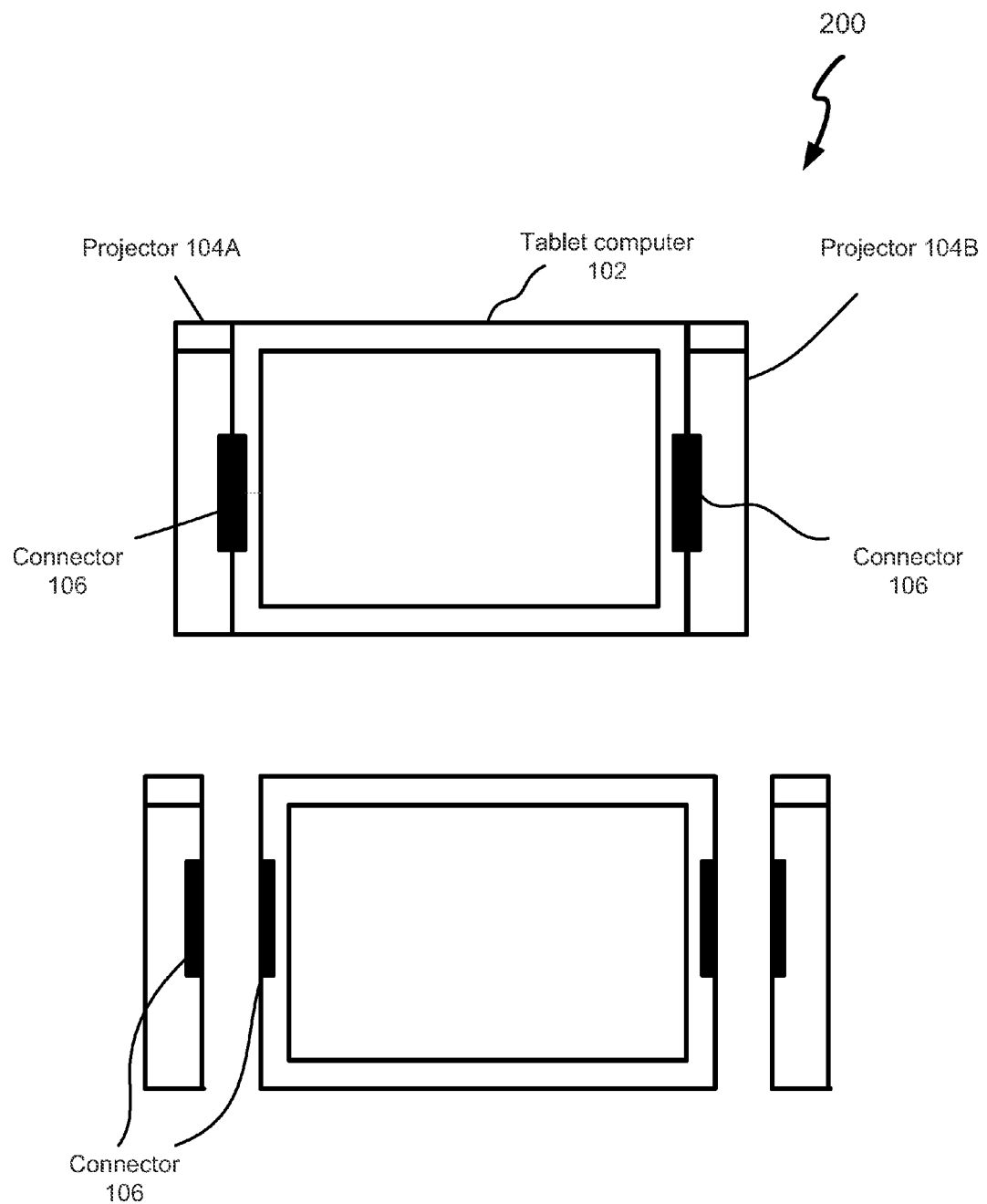
FIG. 2 is a schematic diagram of a tablet computer with two detachable projectors.

FIG. 2 is a schematic diagram of another exemplary video delivery system 200 including a tablet computer with two detachable projectors. System 200 includes two detachable projectors 104A and 104B that are connected to tablet computer 102 from each of two opposite sidewalls through connectors 106. Tablet computer 102 may decide to use either one of the projectors or to use both of the projectors. In one aspect, a media file such as a video file may be presented when projectors 104A and 104B are connected to tablet computer 102. In another aspect, the video file may be presented when projectors 104A and 104B are detached from tablet computer 102. Tablet computer 102 is used as a remote control for detached projectors.

In one operation mode, 104A and 104B may present the same image or video file. In another operation mode, 104A may present a different image from the image presented by 104B. For example, 104A may present a text file and 104B may present a graphics during a presentation. In yet another operation mode, 104A and 104B may project two adjacent screens. Each of the screens displays half of an image. The two adjacent screens display jointly a completed image.

Figure 3:
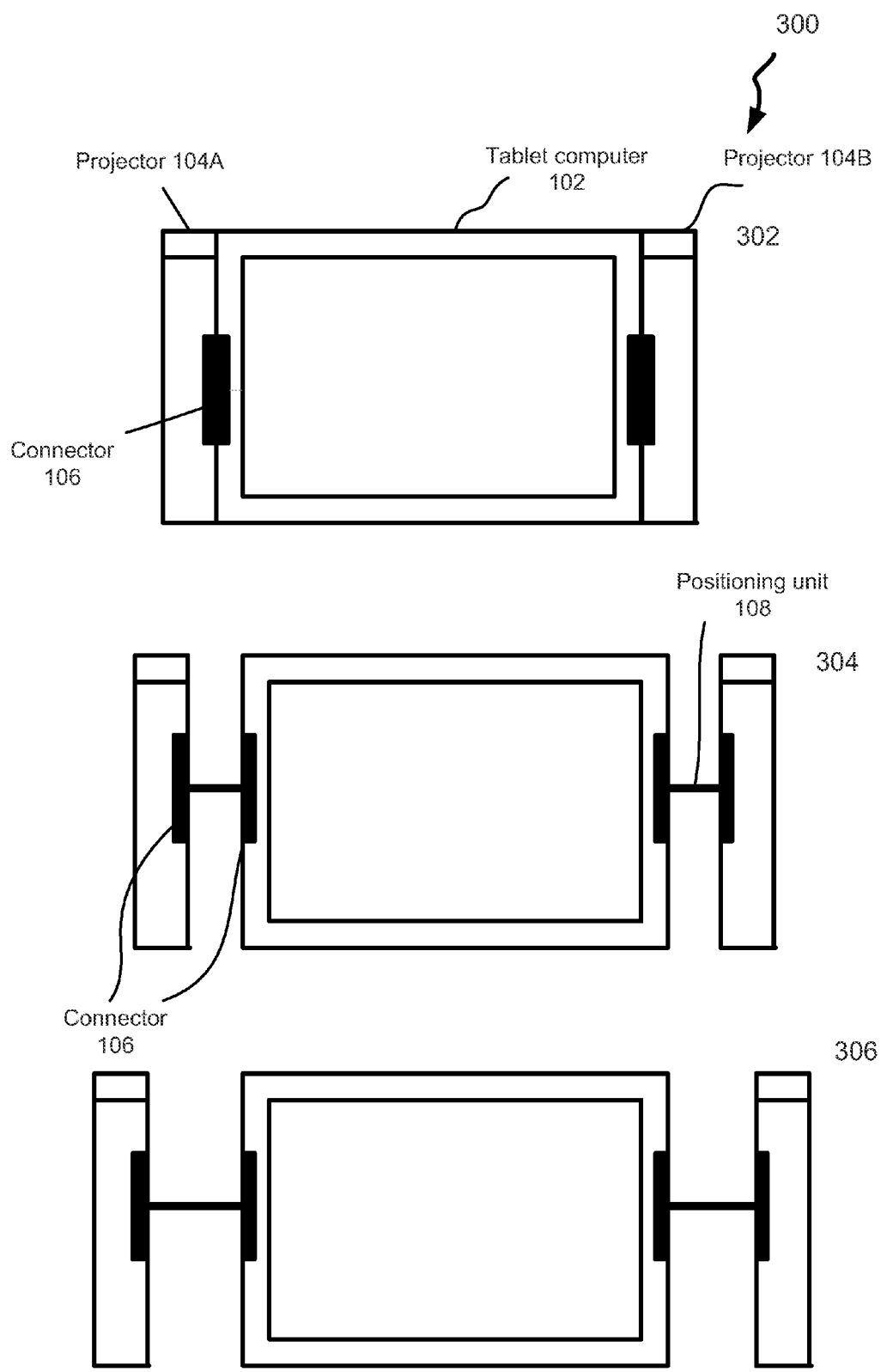
FIG. 3 is a schematic diagram of a tablet computer with two detachable projectors with adjustable positions by positioning units.

FIG. 3 illustrates in 300 that positions of projector 104A and projector 104B may be changeable by positioning unit 108. 302 illustrates that projector 104A and projector 104B are attached to tablet computer 102. 304 illustrates that positions of 104A and 104B are changed using positioning unit 108. 306 illustrates that the positions of 104A and 104B can be changed further to project screens onto desirable positions.

In one aspect, 104A and 104B are remained as connected to tablet computer 102 through 106A and 106B. In another aspect, connector 106 disconnected. In such an implementation, 104A and 104B are wirelessly connected to tablet computer 102. 104A and 104B may be moved horizontally. 104A and 104B may also be moved vertically. Mechanisms for moving 104A and 104B are known in the art.

Figure 4:
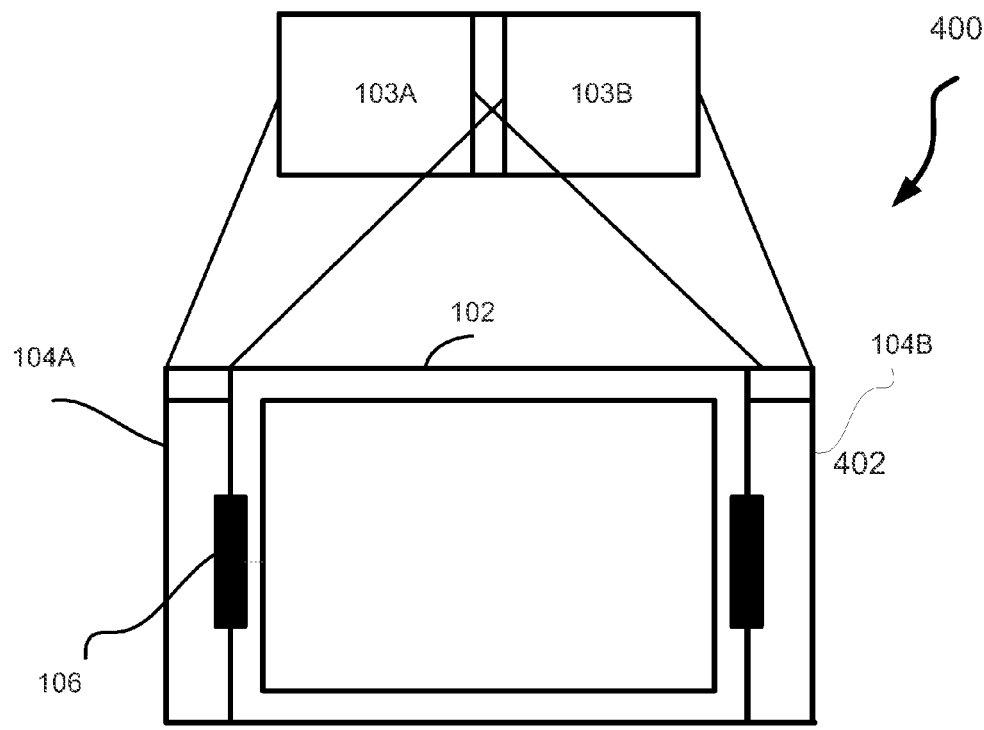
FIG. 4 is a schematic diagram illustrating that positions of projected display screens are adjustable.
Figure 4:
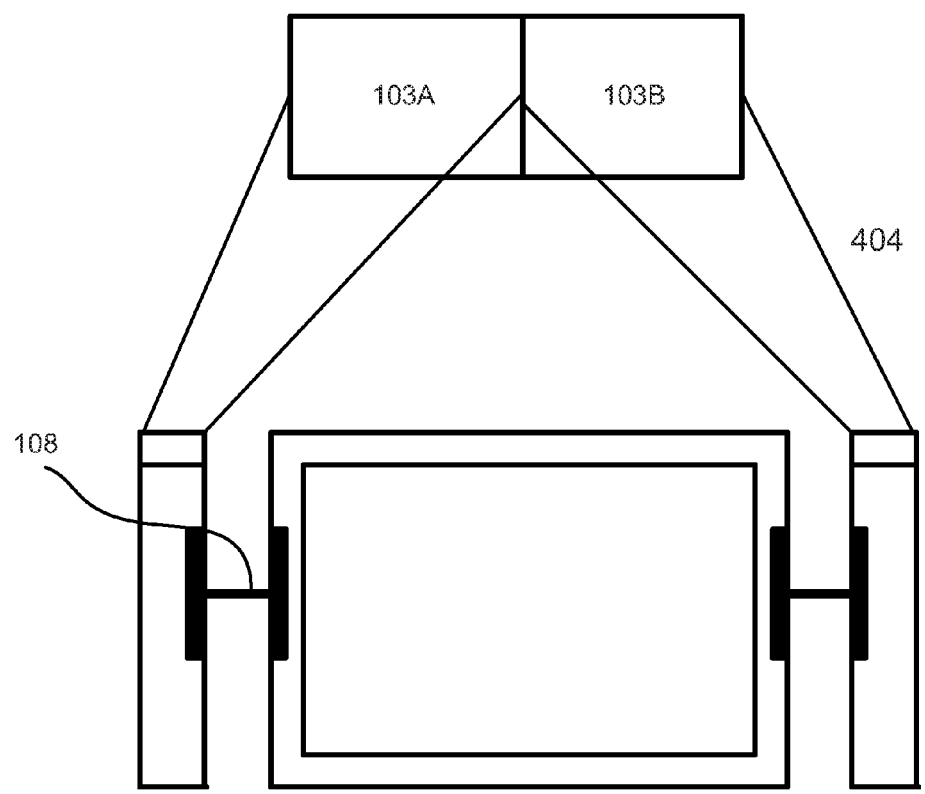

FIG. 4 illustrates in 400 that projector 104A projects a display screen that overlaps a display screen projected by 104B (402). The problem can be resolved by moving 104A and 104B horizontally through positioning units 108 as shown in 404.

Figure 5:
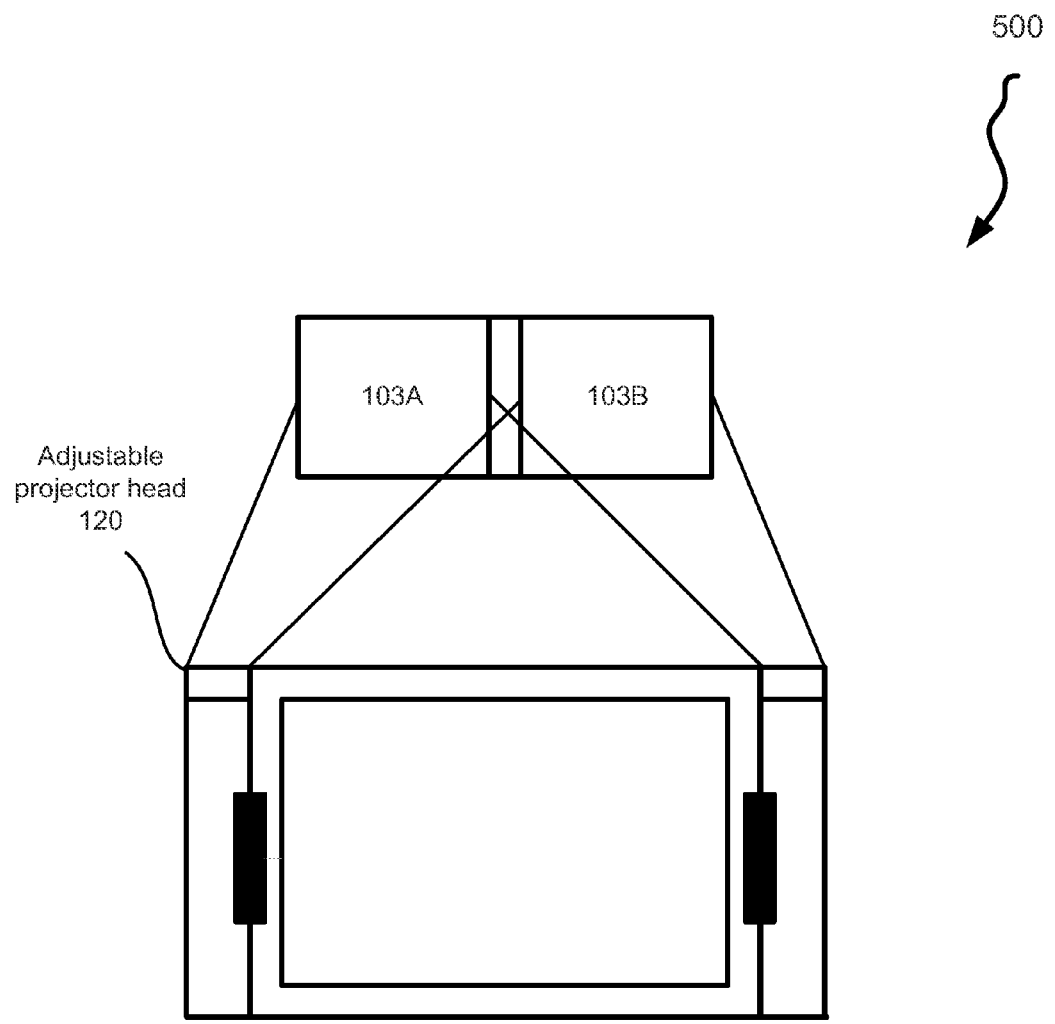
FIG. 5 is a schematic diagram illustrating two projectors with adjustable projector heads for adjusting positions of displayed screens.
Figure 6:
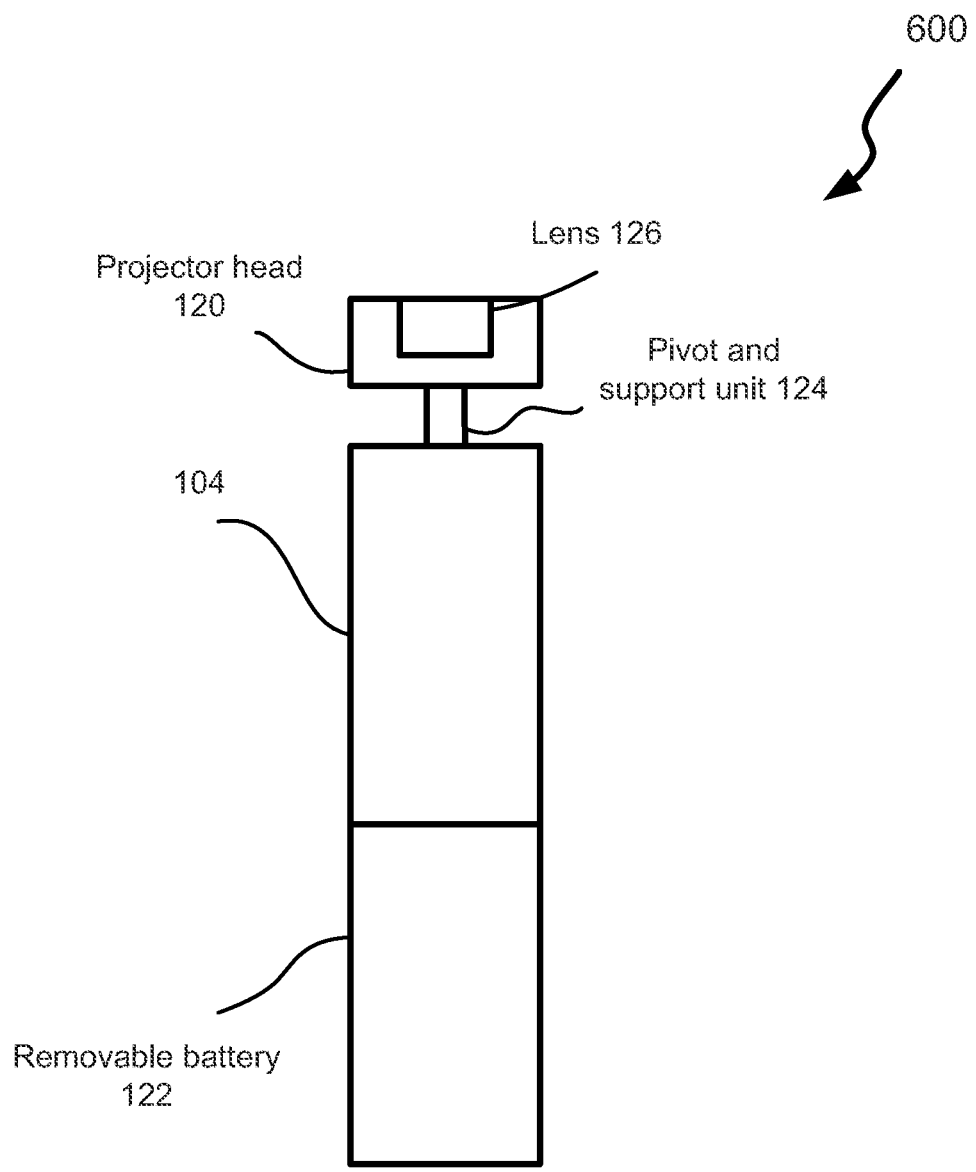
FIG. 6 is an exemplary projector with a pivot and support unit for the projector head and with a removable battery.

In another implementation (500) as shown in FIG. 5, the positions projected screens may be adjusted by pivoting projector heads 120. In one aspect, the projector heads are adjusted when projector 104A and projector 104B are attached to tablet computer 102. In another aspect, the projector heads are adjusted when 104A and 104B are detached from tablet computer 102. A more detailed schematic diagram of a projector (600) is illustrated exemplary in FIG. 6. Projector 104 includes a projector head 120. Projector head 120 further includes a pivot and support unit 124 and a lens 126. Projector 104 further comprises a battery unit 122. Battery unit 122 may include a rechargeable battery. Battery unit 122 may be removable from projector 104.

Figure 7:
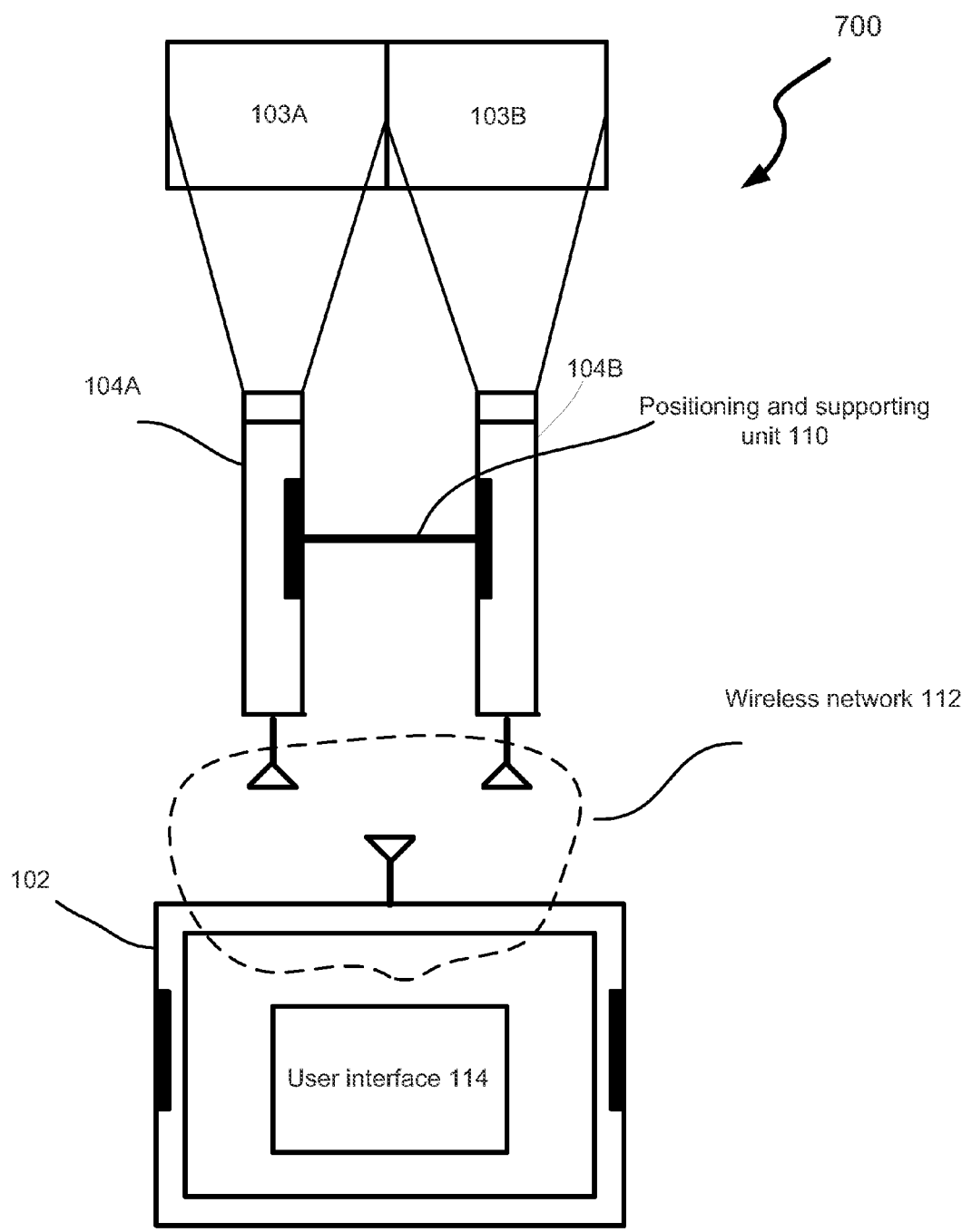
FIG. 7 is a schematic diagram illustrating that two detached projectors are controlled by the tablet computer through a wireless network to project two adjacent screens.

In some embodiments, media assets such as video files may be presented after projectors 104A and 104B are detached from tablet computer 102. FIG. 7 is a schematic diagram illustrating a preferred embodiment 700 that two detached projectors are placed into a positioning and supporting unit 110. Positions of projector 104A and projector 104B can be adjusted horizontally and/or vertically to project desired screens on a surface such as a wall. Details of positioning and supporting unit 110 are not shown in FIG. 7 as these are well known in the art. Positioning and supporting unit 110 may be a portable unit. Positioning and supporting unit 110 may also be a unit fixed to a structure such as to a wall.

After 104A and 104B are detached from tablet computer 102, a wireless communication network 112 is formed amongst 104A, 104B and 102. In one aspect, network 112 is an ad hoc wireless communication network that includes but is not limited to a Bluetooth type (IEEE 802.15.1 and its extensions), a ZigBee type (IEEE 802.15.4 and its extensions) and WiFi type (IEEE 802.11 and its extensions). Tablet computer 102 may include a program that controls operations of delivering video files through the detached projectors. A user interface (UI) 114 may be displayed on a display screen of tablet computer 102.

Before 104A and 104B are detached from tablet computer 102, image and/or video files have been transferred from a file storage system of tablet computer 102 to auxiliary file storage systems in 104A and in 104B. In one aspect, metadata of the transferred files are stored in the file storage system of tablet computer 102. In another aspect, metadata of the transferred files are stored in a cache. The cache provides a higher operation speed and may be a part of the file storage system. The cache may be implemented using semiconductor Static Random Access Memory (SRAM) technologies.

After formation of wireless network 112, UI 114 displays a list of user selectable media files such as video files in accordance with the metadata stored in tablet computer 102. UI 114 may further be a hierarchical user interface. After a file is selected, metadata of the selected file is transmitted from tablet computer 102 to 104A and 104B through wireless network 112. After receiving the metadata, the selected file is retrieved from the auxiliary file storage systems for processing and for delivering by the projectors.

A video file includes a video portion and an audio portion. In one aspect, video portion of the video file is transferred to projectors 104A and 104B while audio portion is remained in tablet computer 102. The audio portion of the video file may be delivered by tablet computer through its audio signal processing unit and microphones or speakers. The audio processing unit may further include a coder/decode (CODEC) unit. The audio portion of the video file may also be delivered through an external speaker system. The speaker system may be coupled to tablet computer through a wired or a wireless link. In another aspect, audio portion of the video file may be transferred to the projectors. The audio portion of the video file may be transferred further from the projectors to an external speaker system through a wired or a wireless connection. In one aspect, the external speaker system may be integrated with positioning and supporting unit 110.

Furthermore, a video image may be divided into a left and a right portion. Projector 104A and projector 104B may be used to deliver left and right portions, respectively. Two display screens projected by 104A and by 104B must be aligned side by side in an adjacent manner An ultra wide display screen consists of two screens projected by 104A and 104B can then be obtained.

Delivering video portions through projectors 104A and 104B and delivering audio portion through tablet computer 102 need to be synchronized. In one aspect, a first clock is included in 104A, a second one in 104B and a third one in 102. The clocks are calibrated before 104A and 104B are detached from 102. When a video file is selected by the user through UI 114, metadata of the selected video file is transmitted together with a starting time for delivering the video file. Therefore, the video portions and the audio portion can be delivered concurrently in a synchronized manner.

UI 114 may also be used to present user adjustable parameters for the projectors that include but are not limited to brightness, contrast and focus. The control parameters may be transmitted from tablet computer 102 to projectors 104A and 104B at the same time the metadata is transmitted. The control parameters may also be transmitted at anytime that an input from the user through UI 114 is received by a processor of tablet computer 102.

Figure 8:
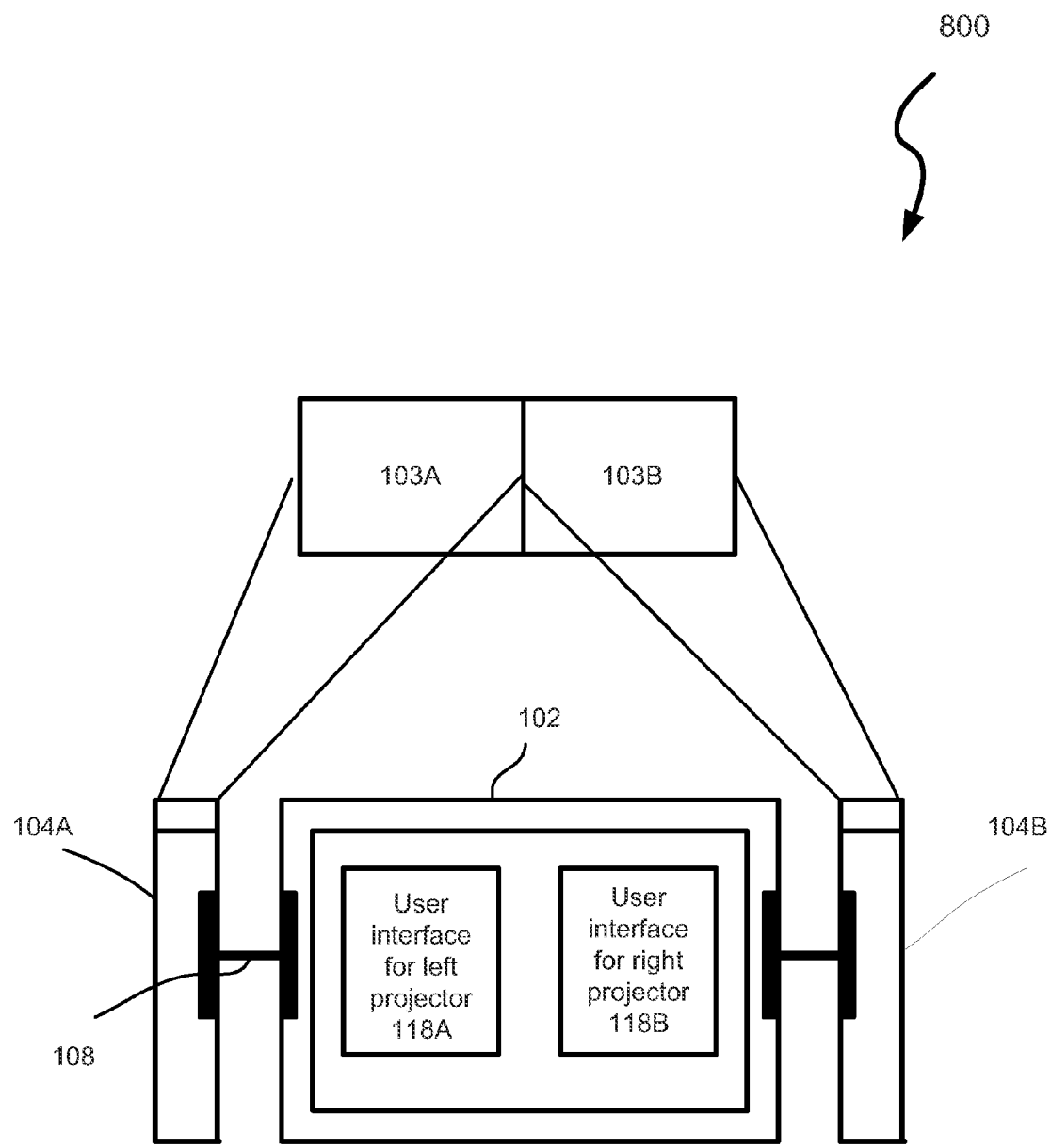
FIG. 8 is a schematic diagram illustrating that two user interfaces are displayed on the tablet computer to control two projectors independently.

FIG. 8 is a schematic diagram illustrating an alternative way to control the projectors by the tablet computer (800). A user interface 118A is displayed for the user to control projector 104A and another user interface 118B to control projector 104B. A tablet computer with a relatively large display screen is suitable for displaying two display windows for two user interfaces.

Figure 9:
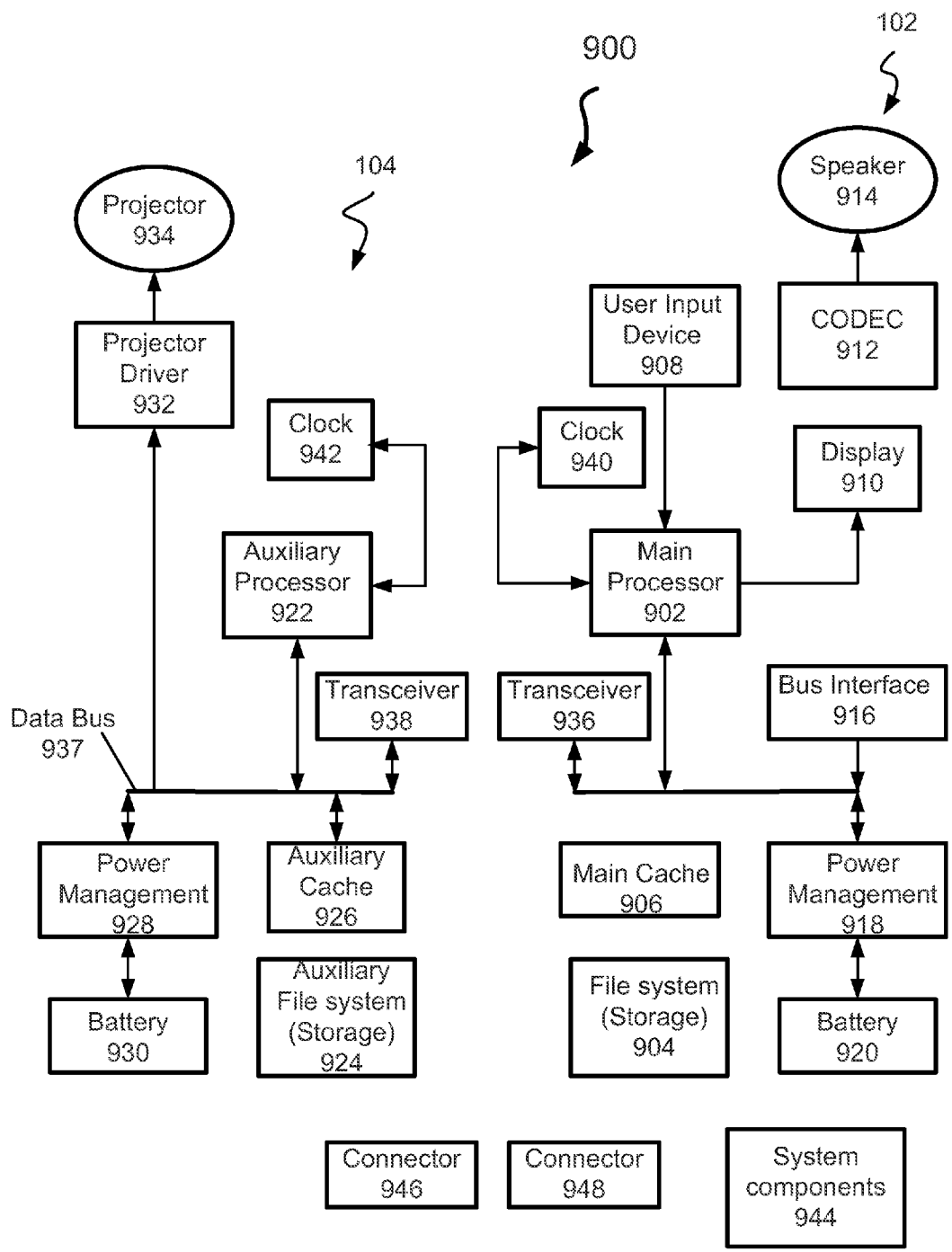
FIG. 9 is a schematic diagram illustrating functional blocks of a tablet computer with an attachable projector.

FIG. 9 is a schematic diagram illustrating functional blocks 900 of tablet computer 102 with an attached projector 104A for illustration only. An additional projector 104B can be added. A tablet computer is taken in an exemplary manner. Other portable computing device, such as, for example, a smart phone, a handheld media player, a laptop computer and an image capturing device can also be used. Tablet computer 102 includes a main processor 902 that pertains to a microprocessor or a controller for controlling the overall operation of tablet computer 102. Tablet computer 102 stores media files such as video files in a main file system 904 and a main cache 906. The main file system 904 is, typically, a flash memory or a plurality of flash memories or a storage disk or a plurality of disks. The main file system 904 typically provides high capacity storage capability for tablet computer 102. However, since the access speed to the main file system 904 is relatively slow, the tablet computer 102 can also include a main cache 906. The main cache 906 is, for example, RAM (Random-Access Memory) provided by semiconductor memory. The relative access time to the main cache 906 is substantially shorter than for the main file system 904. However, the main cache 906 does not have the large storage capacity of the main file system 904.

Tablet computer 102 also includes a user input device 908 that allows a user to interact with the tablet computer. For example, the user input device 908 can take a variety of forms, such as a button, keypad, dial, etc. Still further, the tablet computer 102 includes a display 910 (screen display) that is controlled by the main processor 902 to display information to the user. The display 910 may be a touch sensitive screen. UI 114 may be displayed on display 910 with user selectable items. The user can make a selection by touching the displayed item by his or her finger. Tablet computer 102 further comprises a CODEC 912 and a speaker 914 for delivering audio portion of the video file. Tablet computer 102 further comprises a data bus 937 that facilitates data transfer among functional blocks. Other functional blocks include a bus interface 916, a power management unit 918, a battery 920 and other system components 944. Tablet computer 102 further comprises a clock 940.

Projector 104A comprises an auxiliary processor 922 pertaining to control operations of the projector unit 104A, an auxiliary file system 924 and an auxiliary cache 926. The inclusion of auxiliary cache 926 is optional. Projector 104A further comprises a projector driver 932 and a micro projector 934. Projector 104A includes also a power management unit 928 and a battery 930. Projector 104A further comprises a clock 942.

Transceivers 936 and 938 are included in tablet computer 102 and in projector 104A for establishing wireless communication network 112 when projector 104A is detached from tablet computer 102. The data is transmitted between the tablet computer 102 and the projector 104A via the wireless communication network that conforms to one of the following IEEE standards that include but are not limited to Bluetooth (IEEE 802.15.1), ZigBee (IEEE 802.15.4 and its extensions) and WiFi (IEEE 802.11 and its extensions). An antenna required for wireless networking is typically included within the housing of the wireless interface 936 and 938. Such an antenna may take a variety of forms, such as an antenna printed on a standard PCB (printed circuit board). Such antennas are well known to those skilled in the art. Tablet computer 102 and projector 104A further comprise a pair of connector 946 and 948 that forms connector 106. Tablet computer 102 may include one more pair connectors for 104B (not shown in FIG. 9).

Figure 10:
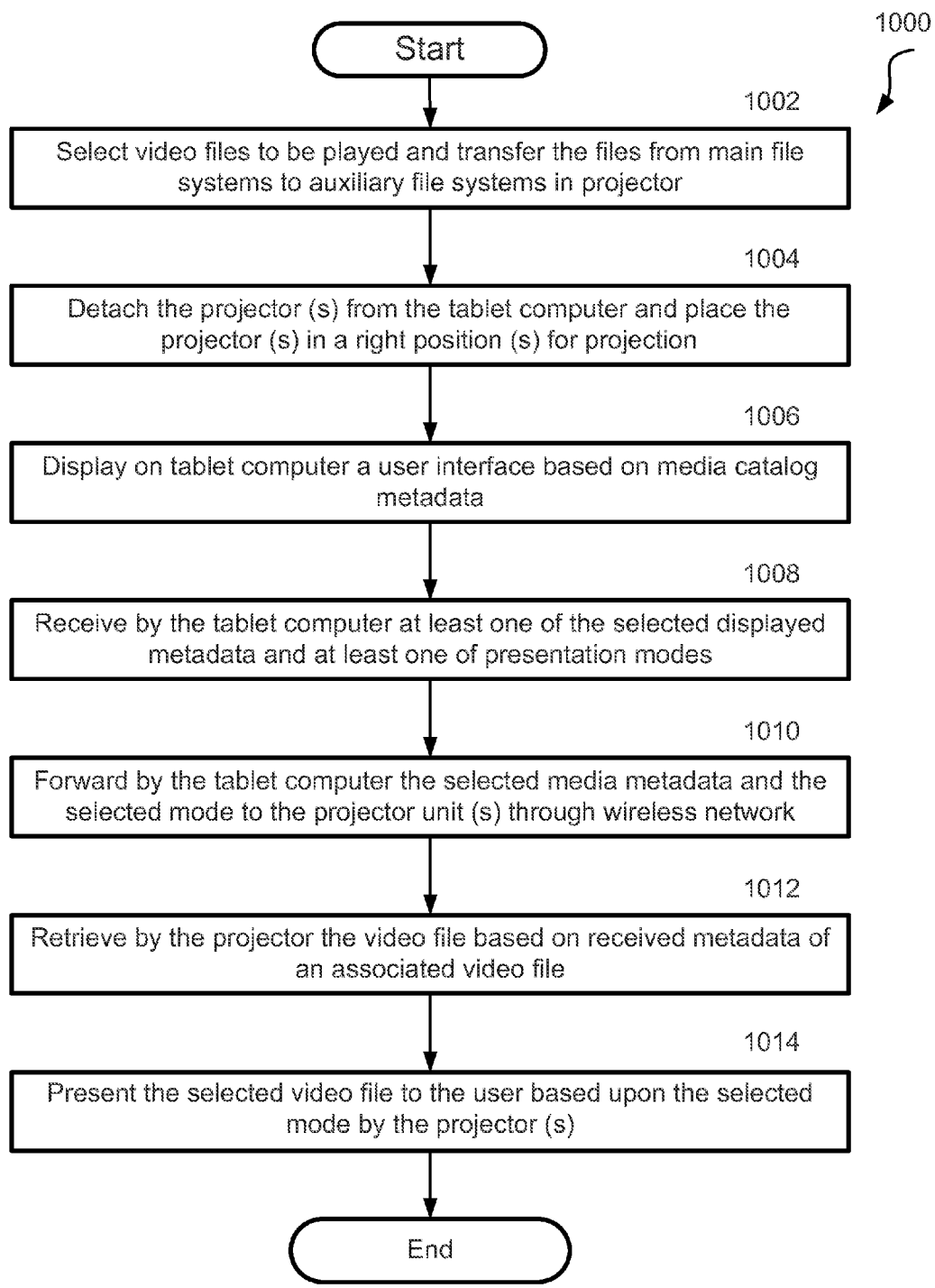
FIG. 10 is a flow chart illustrating operation of an exemplary image and video delivery system.

FIG. 10 shows a flow diagram of remotely controlling the detached projectors 104A and 104B by tablet computer 102 through wireless communication network 112. Process 1000 begins with step 1002 that video files are selected by a user through a user interface for transferring from main file system 904 in tablet computer 102 to auxiliary file system 924 in the projector 104A. A user then detaches projector 104A and projector 104B from tablet computer 102. 104A and 104B are placed in right positions for projecting display screens (1004). 104A and 104B may be placed into positioning and supporting unit 110. Projectors 104A and 104B may project two adjacent screens. UI 114 is displayed on displays screen of tablet computer 102 (1006). UI 114 may display a list of user selectable metadata of the video files stored in auxiliary file system 924. The user's selection is received by the main processor 902 of tablet computer 102 (1008). The user may also select one of the operation modes for displaying. For example, the user may select to use the displayed screen from 104A for one half of the image and to use display screen from 104B for the other half of the image. The use may also select or modify a number of control parameters, such as, for example, brightness, contract and focus. The selected metadata and other parameters related the operation mode and controls are transmitted from tablet computer 102 to projectors 104A and 104B via wireless communication network 112 (1010). Upon receiving the transmitted data, projector 104A and projector 104B retrieve the video file associated to the metadata (1012). In one aspect, only video portion of the video file is retrieved. In another aspect, 104A and 104B may retrieve different files. The selected video file is presented accordingly (1014). The audio portion of the video file may be delivered through tablet computer 102. The delivering of video portions and the audio portion is synchronized according to a time determined by the clocks in each of the units. The clocks are calibrated before 104A and 104B are detached from tablet computer 102.

The invention claimed is:

1. A video delivery system for delivering a video file or an image file, comprising:
 a. a tablet computer including a house comprising four sidewalls;
 b. a first projector attachable to a first sidewall and a second projector attachable to a second sidewall, wherein the first and the second sidewall are opposite to each other;
 c. a means of projecting an image by either one of the projectors or by both of the projectors when the projectors are attached to the tablet computer; and
 d. a means of projecting an image by either one of the projectors or by both of the projectors when the projectors are detached from the tablet computer, wherein said tablet computer provides a means of remotely controlling the detached projectors through a wireless communication network.

2. The system as recited in claim 1, wherein positions of the projectors are adjustable horizontally or vertically when the projectors are attached to the tablet computer.

3. The system as recited in claim 1, wherein said system further includes one of the following operation modes related to projecting an image:
 a. the first projector and the second projector project identical images;
 b. the first projector and the second projector project different images; and
 c. the first projector projects a first portion of an image and the second projector projects a second portion of the image.

4. The system as recited in claim 1, wherein said projector further comprises projector heads, wherein said projector heads can be pivoted.

5. The system as recited in claim 1, wherein said first and said second projectors may be placed into a positioning and supporting unit after said projectors are detached from the tablet computer.

6. The system as recited in claim 1, wherein said tablet computer further includes a user interface for controlling operations of delivering the video file or the image file.

7. The system as recited in claim 1, wherein said tablet computer further includes a first user interface for controlling operations of the first projector and a second user interface for controlling operations of the second projector, wherein said first and said second user interfaces are displayed on a display screen of said tablet computer concurrently.

8. The system as recited in claim 1, wherein said first projector or said second projector further comprises a file storage system, a battery unit and a micro projector.

9. The system as recited in claim 1, wherein said projector further comprises a micro projector based upon one of the following approaches:
 a. a Digital Light Processing (DLP);
 b. a laser beam-steering technology; and
 c. a Liquid Crystal on Silicon (LCoS) technology, wherein said micro projector further comprising lasers or Light Emitting Diodes (LED) as lighting sources.

10. The system as recited in claim 1, wherein said system further comprises a means of transferring one or a plurality video files or image files from the tablet computer to the projectors when the projectors are attached to the tablet computer.

11. The system as recited in claim 10, wherein said tablet computer further comprises a file storage system for storing metadata of the transferred video files, wherein said file storage system further includes a cache.

12. The system as recited in claim 1, wherein said wireless communication network conforms to one or a combination of the following standards:
 a. Wi-Fi;
 b. Bluetooth; and
 c. ZigBee.

13. The system as recited in claim 1, wherein said connector further comprising:
 a. an IEEE 1394 compliant type of connector; and
 b. a USB (Universal Serial Bus) type of connector.

14. The system as recited in claim 1, wherein said first projector further comprises a first clock, wherein said second projector further comprises a second clock and said tablet computer further comprises a third clock, wherein said clocks are utilized to synchronize an operation of delivering a video portion of a video file through the projectors and delivering an audio portion of the video file through the tablet computer in a synchronized manner.

15. A method of delivering a video file including a video portion and an audio portion to a user using a tablet computer including a first and a second detachable projectors, the method comprising:
 a. coupling by the user the first projector through a first connector and the second projector through the second connector to the tablet computer;
 b. transferring by a processor of the tablet computer at least the video portion of a video file from the tablet computer to auxiliary file storage systems of the projectors;
 c. detaching by the user said projectors from the tablet computer and placing the projectors to a suitable position for delivering the video file;
 d. establishing automatically a wireless communication network amongst the tablet computer, the first and the second projectors;
 e. controlling an operation of delivering the video portion of the video file using said projectors and the audio portion of the video file by using said tablet computer as a remote control device.

16. The method as claimed in claim 15, wherein said method further comprising:
 a. displaying a plurality of metadata of video files stored in said auxiliary file storage systems of said projectors;

b. selecting one of the displayed metadata of the video files by the user through a user interface of said tablet computer;

c. transferring the selected metadata from said tablet computer to said projectors through said wireless communication network; and d. retrieving the video portion of selected video file from said auxiliary file storage systems.

17. The method as recited in claim 15, wherein said synchronized manner of delivering video portions and audio portion of the video file is accomplished through a plurality clocks in the projector units and in the tablet computer.

18. The method as recited in claim 15, wherein said video file further comprises a first video portion of the video file and a second video portion of the video file, wherein the first video portion is delivered by a first projector and the second video portion is delivered by the second projector.

19. The method as recited in claim 15, wherein said tablet computer transfers audio portion of the video file to a speaker system.

20. A method of delivering a video file including a video portion and an audio portion to a user using a tablet computer including a first and a second detachable projector units, the method comprising:

a. coupling by the user the first projector unit through a first connector and the second projector unit through the second connector to the tablet computer;

b. adjusting positions of the projector units through positioning units and/or adjusting projector heads through a pivoting unit to suitable positions for projecting two screens on a display surface;

c. delivering a video portion of the video file through the projectors and an audio portion of the video file through the tablet computer in a synchronized manner.

* * * * *